(12) United States Patent
Lin

(10) Patent No.: US 7,527,385 B2
(45) Date of Patent: May 5, 2009

(54) ADJUSTABLE LENS MODULE AND IMAGE PROJECTOR APPLIED WITH THE SAME

(75) Inventor: Ying-Fang Lin, Taoyuan (TW)

(73) Assignee: Qisda Corporation, Taoyuan County (TW)

( * ) Notice: Subject to any disclaimer, the term of this patent is extended or adjusted under 35 U.S.C. 154(b) by 480 days.

(21) Appl. No.: 11/324,456

(22) Filed: Jan. 3, 2006

(65) Prior Publication Data
US 2006/0146298 A1  Jul. 6, 2006

(30) Foreign Application Priority Data
Jan. 3, 2005  (TW) .............................. 94100104 A

(51) Int. Cl.
G02B 15/14  (2006.01)
(52) U.S. Cl. .................. 353/101; 359/703; 359/811
(58) Field of Classification Search .................. 353/119, 353/100, 101; 359/798–801, 804, 805, 808–811, 359/819, 822, 823, 827, 813, 703
See application file for complete search history.

(56) References Cited

U.S. PATENT DOCUMENTS

| | | | |
|---|---|---|---|
| 6,280,035 B1 * | 8/2001 | Tadic-Galeb et al. .......... 353/31 |
| 6,594,089 B2 * | 7/2003 | Tanabe et al. ................ 359/703 |
| 6,933,987 B2 * | 8/2005 | Menard ....................... 348/745 |
| 7,061,699 B2 * | 6/2006 | Watanabe et al. ............ 359/819 |
| 2002/0154278 A1 * | 10/2002 | Masuda ....................... 353/101 |
| 2003/0210479 A1 * | 11/2003 | Watanabe et al. ............ 359/823 |
| 2004/0041988 A1 * | 3/2004 | Kitamura ....................... 353/99 |
| 2005/0185152 A1 * | 8/2005 | Velde et al. .................. 353/101 |

FOREIGN PATENT DOCUMENTS

JP  2001154265  6/2001

\* cited by examiner

Primary Examiner—William C. Dowling

(57) ABSTRACT

An adjustable lens module applied to an image projector is provided. The lens is positioned in a lens barrel situated within a lens housing mounted on a frame. The adjustable lens module includes a base plate, and a first, a second and a third positioning means. The base plate connected to the lens barrel is attached to the lens housing and mounted on the frame. The first, second and third positioning means are respectively positioned at the first, second and third corners of the base plate. The first and second corners are arranged diagonally on the base plate. At least the first and second positioning means are adjustably secured at the first and second corners respectively. By adjusting the relative position between the base plate and the first, second and third position means, a central axis of the lens is substantially parallel to or overlapped with an optical axis.

15 Claims, 3 Drawing Sheets

ADJUSTABLE LENS MODULE AND IMAGE PROJECTOR APPLIED WITH THE SAME

This application claims the benefit of Taiwan application Serial No. 094100104, filed Jan. 3, 2005, the subject matter of which is incorporated herein by reference.

BACKGROUND OF THE INVENTION

1. Field of the Invention

The invention relates in general to an adjustable lens module, and more particularly to an adjustable lens module and an image projector applied with the same.

2. Description of the Related Art

Home theater systems are gaining wider popularity. The image projector used in a home theater, such as a back projection TV for instance, is mainstream. Therefore, how to produce an image projector for meeting the consumer's high requirement has become an imminent challenge to the manufacturers.

An image projector mainly includes a light source, an optical assembly, an imaging device and a lens module. The image projector functions by enabling the beam of light generated by the light source to be projected to the imaging device via the optical assembly, and then the beam of light is further reflected to the lens to generate an image. The optical assembly includes a color wheel, a condenser and a fold mirror. Examples of the imaging device include a digital micro-mirror device (DMD) and a liquid crystal display (LCD) panel. A DMD has on its surface several hundred thousand microscopic mirrors arranged in a rectangular array which correspond to the pixels in the image to be displayed. When the image projector functions, the optical path from the light source to the imaging device has to be correct, so that the luminance region generated when the beam of light is projected to the imaging device overlaps with the imaging device, enabling the image of the imaging device to be completely projected onto a screen via a lens of the lens module.

A precise optical path can be found to assure that the luminance region is substantially overlapped with the imaging device if the optical components of the image projector are appropriately incorporated. However, after the optical components are assembled, the tolerance of an optical component may differ with one another and needs to be compensated before image can be clearly and completely projected onto the screen via the imaging device and lens.

In a conventional image projector, the lens is received within a lens barrel. The lens barrel is covered by a housing, thereby mounting the lens barrel on the frame of the image projector. The method of mounting the housing on the frame is achieved by applying several fasteners to the flange of the housing so that the housing is fixed to the frame of the image projector. That is, the lens is no more adjustable once fixed. Since the lens can not be adjusted in the conventional design, the tolerance can not be compensated.

Therefore, it is necessary to provide an adjustable lens module whose lens can be quickly and easily adjusted to compensate the tolerance between the optical components, thereby saving the required time and labor. After the tolerance is compensated, the central axis of the lens is substantially parallel to or overlapped with the optical axis of the lens to receive the beam of light precisely. Consequently, the image can be completely and precisely projected onto the screen via the imaging device and lens.

SUMMARY OF THE INVENTION

It is therefore the object of the invention to provide an adjustable lens module disposed in an image projector for quickly and easily adjusting the position of the lens to compensate the tolerance of the optical assembly for the image to be precisely projected onto the screen via the lens.

According to an object of the invention, an adjustable lens module applied to an image projector for quickly and easily adjusting the position of the lens is provided. The lens is positioned in a lens barrel situated within a lens housing. The lens housing is mounted on a frame. The adjustable lens module includes a base plate, a first positioning means, a second positioning means and a third positioning means. The base plate connected to the lens barrel is attached to the lens housing and mounted on the frame. The first positioning means is positioned at a first corner of the base plate. The second positioning means is positioned at a second corner of the base plate. The third positioning means is positioned at a third corner of the base plate. The first corner and the second corner are arranged diagonally on the base plate, and at least the first positioning means and the second positioning means are adjustably secured at the first corner and the second corner respectively. By adjusting the relative positions between the base plate and the first, the second and the third position means, a central axis of the lens is substantially parallel to or overlapped with an optical axis of the lens.

According to another object of the invention, an image projector is provided. The projector includes a light source used for providing a beam of light, an optical assembly, an imaging device, a frame, a lens module and at least a positioning means. The lens module is adjustably disposed on the frame. The positioning means is adjustably positioned on the lens module, enabling the lens module to be adjusted in a direction. The beam of light collected by the optical assembly is projected to the imaging device, and then reflected to the lens module. The lens module disposed on the frame has a lens barrel, a lens housing for receiving the lens barrel, a lens positioned within the lens barrel, and a base plate. The base plate connected to the lens barrel is attached to the lens housing and mounted on the frame. An example of the positioning means (positioned at a corner of the base plate) is a unit including a fastener and an elastic component. The elastic component is mounted on the fastener and positioned between the base plate and the frame.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides an adjustable lens module for simply and efficiently adjusting the lens of the image projector to compensate the tolerance of each optical component after assembly. The adjusted lens can precisely and completely project the image onto the screen. It is noted that the embodiment has been disclosed herein for illustrating the present invention, but not for limiting the scope of the present invention. Additionally, the drawings used for illustrating the embodiment of the present invention only show the major characteristic parts in order to avoid obscuring the present invention. Accordingly, the specification and the drawings are to be regard as an illustrative sense rather than a restrictive sense.

Figure 1:
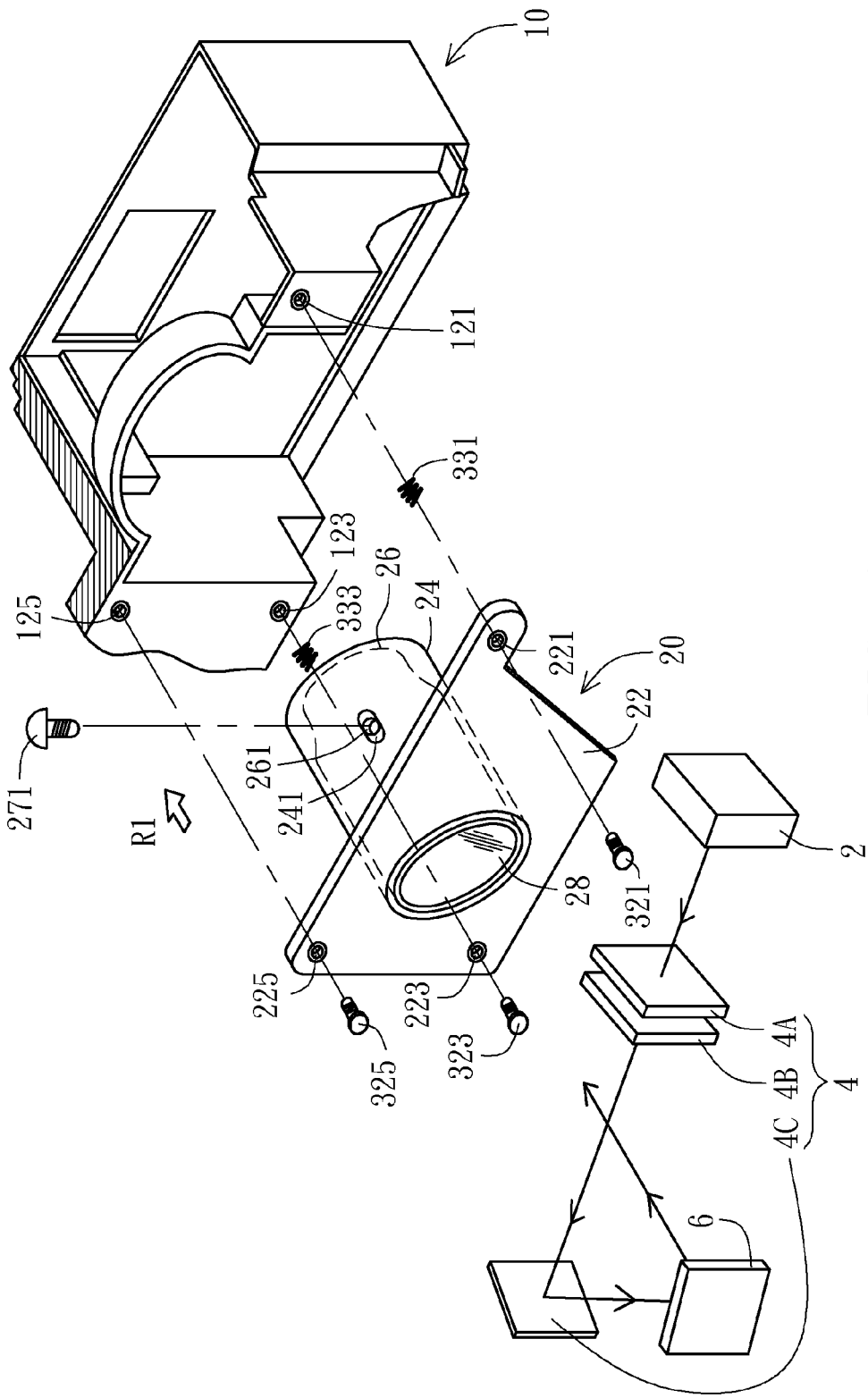
FIG. 1 is an assembly diagram of a lens module and a frame of an image projector according to a preferred embodiment of the invention.

Referring to FIG. 1, an assembly diagram of a lens module and a frame of an image projector according to a preferred embodiment of the invention is shown. The image projector having a frame 10 comprises the main components such as a light source 2 an optical assembly 4, an imaging device 6 and a lens module 20. When the image projector functions, the beam of light generated by the light source 2 passes through the optical assembly 4 to be projected onto the imaging device 6, and then reflected to the lens 28. The image of the imaging device 6 is projected onto the screen via the lens 28 while the imaging device 6 overlaps with the luminance region generated from the beam of light projected to the imaging device 6. The optical assembly 4 includes a color wheel 4A, a condenser 4B and a fold mirror 4C for instance. Examples of the imaging device 6 include a digital micro-mirror device (DMD) and a liquid crystal display (LCD) panel.

As shown in FIG. 1, the lens module 20 includes a base plate 22, a lens housing 24, a lens barrel 26 and a lens 28. The lens barrel 26 having the lens 28 is positioned within the lens housing 24 and connected to the base plate 22. The base plate 22 is attached to the lens housing 24 and mounted on the frame 10. In the present embodiment, the base plate 22 is preferably formed in one-piece molding with the lens housing 24. Therefore, by adjusting the three dimensional positions of the base plate 22, the positions of the lens housing 24 and the lens barrel 26 are simultaneously changed so as to implement the position adjustment of the lens 28. Accordingly, the lens 28 can precisely receive image from the imaging device and then completely and clearly project the image onto the screen.

As shown in FIG. 1, the adjustable lens module of the embodiment includes a first positioning means, a second positioning means, and a third positioning means. The first positioning means is positioned at a first corner of the base plate 22 and includes a first fastener such as a first screw 321 and a first elastic component such as a first spring 331. The second positioning means is positioned at a second corner of the base plate 22 and includes a second fastener such as a second screw 323 and a second elastic component such as a second spring 333. The third positioning means is positioned at a third corner of the base plate 22 and includes a third fastener such as a third screw 325.

The first corner, the second corner and the third corner of the base plate 22 respectively have a first opening 221, a second opening 223 and a third opening 225 disposed therein. A fastening hole 121, a second fastening hole 123 and a third fastening hole 125 are formed on the part on the frame 10, and the positions thereof are corresponding to the first opening 221, the second opening 223 and the third opening 225, respectively.

For the lens module 20 to be disposed on the frame 10, the lens module 20 is moved towards the frame 10 first (as shown in the direction of the arrow R1 of FIG. 1), and then the first corner, the second corner and the third corner of the base plate 22 are positioned. During assembly, the first screw 321 passing through the first opening 221 of the base plate 22 first is received in the first spring 331, and is secured at the first fastening hole 121 of the frame 10 at last. Similarly, the second screw 323 passing through the second opening 223 is received in the second spring 331, and is secured at the second fastening hole 123 at last. The third screw 325 passing through the third opening 225 first is secured at the third fastening hole 125 at last.

Figure 2:
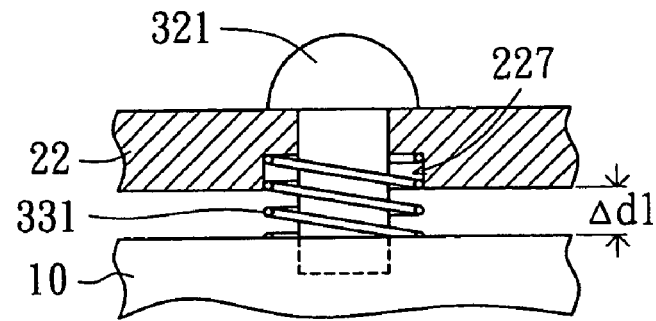
FIG. 2 is a diagram of the first positioning means after assembly of the adjustable lens module of FIG. 1.

FIG. 2 is a diagram of the first positioning means after assembly of the adjustable lens module of FIG. 1. After assembly, the first spring 331 mounted on the first screw 321 is positioned between the base plate 22 and the frame 10. Due to the existence of the first spring 331, the first corner of the base plate 22 and the frame 10 are separated by a distance $\Delta d1$. The deeper the first screw 321 is fastened, the tighter the first spring 331 is compressed, and the smaller the distance $\Delta d1$ will be consequently. Similarly, the second spring 333 mounted on the second screw 323 is also positioned between the base plate 22 and the frame 10, and the distance between the second corner of the base plate 22 and the frame 10 is determined according to how tight the second screw 323 is fastened. In this embodiment, the third screw 325 is directly fixed to the third fastening hole 125, and no clearance exists between the third corner of the base plate 22 and the frame 10.

Besides, a recess is formed on the part of the rear of the base plate 22, and the position of the recess is corresponding to the position of the spring. For example, a first recess 227 as shown in FIG. 2 is used for accommodating the completely compressed first spring 331, allowing no clearance between the first corner of the base plate 22 and the frame 10. Similarly, a second recess (not shown in the diagrams) also exists on the part of the rear of the base plate 22 for accommodating the completely compressed second spring 333, so as to allow no clearance between the second corner of the base plate 22 and the frame 10.

In the present embodiment, the first corner and the second corner of the base plate 22 are arranged diagonally. By adjusting the positions of the first screw 321 and the second screw 323, the three dimensional positions of the base plate 22 is adjustably changed. When the lens 28 is adjusted to be able to precisely receive image from the imaging device, an adhesive can be applied to glue the first screw 321 and the second screw 323 for fixation. Meanwhile, a central axis (as shown in the O axis of FIG. 3B) of the lens 28 is parallel to or overlapped with the optical axis (as shown in the Z axis of FIG. 3A) of the lens.

Figure 3A:
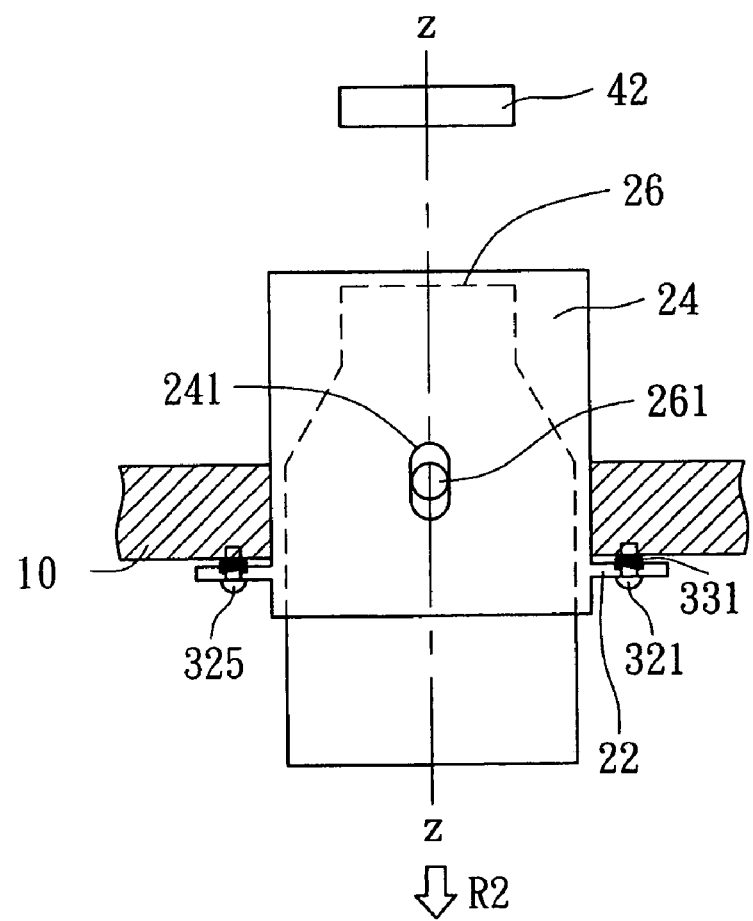
FIG. 3A is a top view of the lens module after assembly of FIG. 1.
Figure 3B:
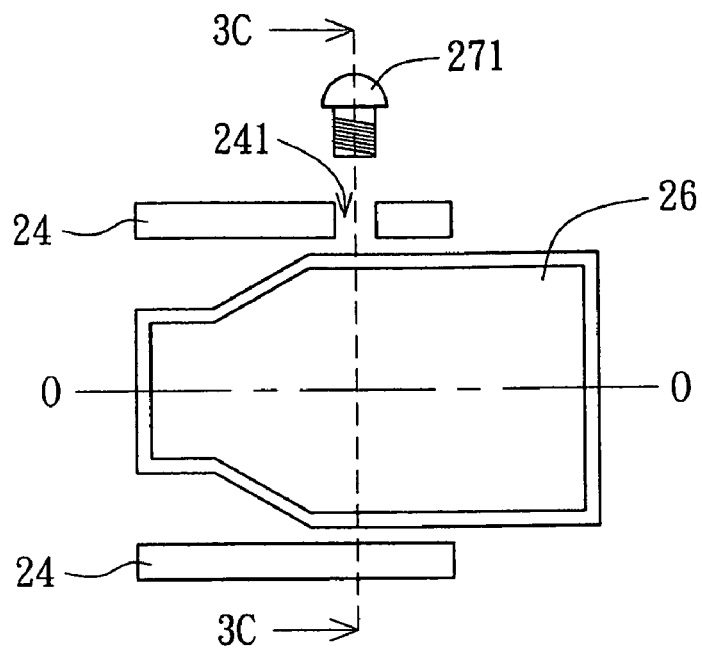
FIG. 3B is a side view of FIG. 3A.
Figure 3C:
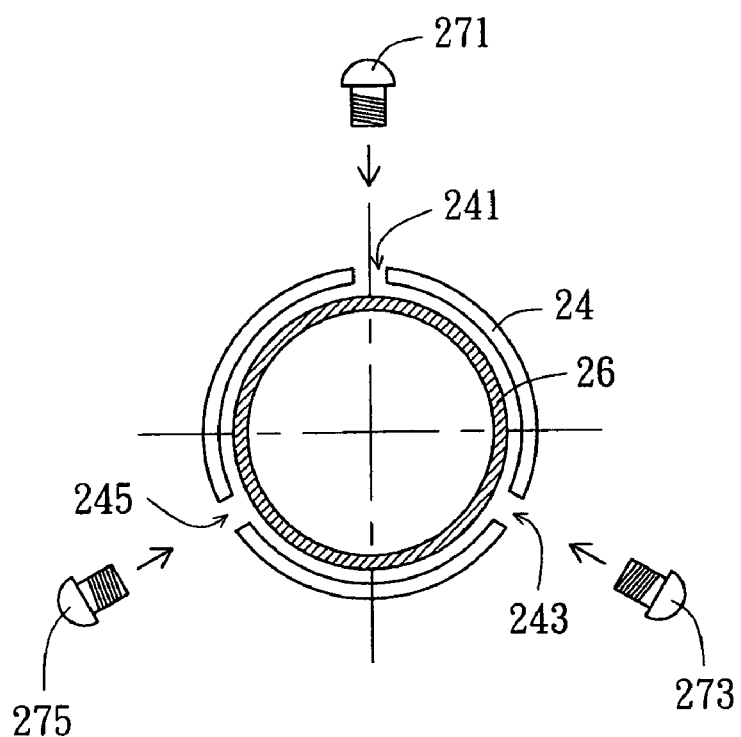
FIG. 3C is a cross-sectional view along the cross-sectional line 3C-3C of FIG. 3B.

Preferably, a mechanism of adjusting the distance between the lens 28 and the imaging device (such as the DMD 42) is equipped in this embodiment. FIG. 3A is a top view of the lens module after assembly of FIG. 1. FIG. 3B is a side view of FIG. 3A. FIG. 3C is a cross-sectional view along the cross-sectional line 3C-3C of FIG. 3B.

As shown in FIG. 3A and FIG. 3B, the lens housing 24 has a first adjustment hole 241 disposed thereon. The lens housing 24 is screwed into the first adjustment hole 241 via a fastener such as a first screw stem 271 to press against the lens barrel 26. The opening of first adjustment hole 241 is preferably oval-shaped. The lens barrel 26 is immobilized at the Z direction (refer to FIG. 3A) when the first screw stem 271 tightly presses against the lens barrel 26. If the first screw stem 271 is loosened, the lens barrel 26 can be moved back and forth along the Z direction to change the distance between the lens 28 and the imaging device such as a digital micro-mirror device (DMD) 42 for instance. The movement of the lens 28 is preferably parallel to the optical axis Z, and the beam of light is projected on a screen in the direction of R2.

In the present embodiment, three adjustment holes as shown in FIG. 3C are disposed on the housing, enabling the lens barrel 26 to be stably moved back and forth along the optical axis Z. The lens housing 24 has the first adjustment hole 241 in addition to the second adjustment hole 243 and the third adjustment hole 245. Similarly, the second screw stem 273 and the third screw stem 275 are respectively screwed into the second adjustment hole 243 and the third adjustment hole 245 to press against the lens barrel 26. Preferably, the angle between every two of the first adjustment hole 241, the second adjustment hole 243 and the third adjustment hole 245 is 120 degrees to stably fasten the lens barrel 26.

In the above embodiment, despite that the third corner of the base plate 22 is designed to be fixed (third screw 325 is directly fixed to the third fastening hole 125) and the lens position is adjusted by the first screw 321 of the first corner and the second screw 323 of the second corner, the application of the invention is not limited thereto. In other practical application, the third positioning means can be adjustable by mounting a third spring on the third screw 325; thus, the three corners of the base plate 22 possess the adjustable functions for optionally processed.

With the incorporation of screws and springs, the adjustable lens module disclosed in the above embodiment, easily and efficiently completes the step of adjusting the lens to compensate the tolerance between the optical components, enabling the lens to precisely project the image of the imaging device onto the screen. When the adjustable lens module is applied to an image projector, the assembly of the parts and components can be quickly and easily done, further lowering the manufacturing cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An adjustable lens module used for adjusting a position of a lens, wherein the lens is positioned in a lens barrel situated within a lens housing, and the lens housing is mounted on a frame, the adjustable lens module comprising:
   a base plate connected to the lens barrel, and the base plate attached to the lens housing and mounted on the frame;
   a first positioning means positioned at a first corner of the base plate, wherein the first positioning means comprises a first fastener and a first elastic component, and the first elastic component is mounted on the first fastener and positioned between the base plate and the frame;
   a second positioning means positioned at a second corner of the base plate, wherein the second positioning means comprises a second fastener and a second elastic component, and the second elastic component is mounted on the second fastener and positioned between the base plate and the frame;
   a third positioning means positioned at a third corner of the base plate, the first corner and the second corner arranged diagonally on the base plate, and at least the first positioning means and the second positioning means adjustably secured at the first corner and the second corner respectively.

2. The adjustable lens module according to claim 1, wherein the third positioning means comprises a third fastener enabling the third corner of the base plate to be directly fixed to the frame.

3. The adjustable lens module according to claim 2, wherein each of the first fastener, the second fastener and the third fastener is a screw, and each of the first elastic component and the second elastic component is a spring.

4. The adjustable lens module according to claim 1, wherein after adjustment, an adhesive is used to glue the first positioning means, the second positioning means and the third positioning means.

5. The adjustable lens module according to claim 1, wherein the base plate is formed in one-piece molding with the lens housing.

6. The adjustable lens module according to claim 1 further comprising a plurality of screw stems, the lens barrel having a plurality of adjustment holes, and the screw stems respectively passing through the adjustment holes to press against the lens barrel.

7. An image projector, comprising:
   a light source used for providing a beam of light;
   an optical assembly;
   an imaging device;
   a frame;
   a lens module adjustably disposed on the frame, wherein the lens module comprises:
     a lens housing supported by the frame;
     a lens barrel positioned within the lens housing;
     a lens positioned in the lens barrel; and
     a base plate connected to the lens barrel, and the base plate is attached to the lens housing and mounted on the frame; and
   a first positioning means, which is adjustably and correspondingly positioned in the lens module so that the lens module can be adjusted in a direction, wherein the first positioning means is positioned at a first corner of the base plate, and the first positioning means comprises a first fastener and a first elastic component, the first elastic component is mounted on the first fastener and positioned between the base plate and the frame;
   wherein the beam of light collected by the optical assembly is projected to the imaging device, and then reflected to the lens module.

8. The image projector according to claim 7, further comprising:
   a second positioning means positioned at a second corner of the base plate; and
   a third positioning means positioned at a third corner of the base plate, the first corner and the second corner arranged diagonally on the base plate, and at least the first positioning means and the second positioning means adjustably secured at the first corner and the second corner respectively.

9. The image projector according to claim 8, wherein the second positioning means comprises a second fastener and a second elastic component, and the second elastic component is mounted on the second fastener and positioned between the base plate and the frame.

10. The image projector according to claim 8, wherein the third positioning means comprises a third fastener enabling the third corner of the base plate to be directly fixed to the frame.

11. The image projector according to claim 8, wherein after adjustment, an adhesive is used to glue the first positioning means, the second positioning means and the third positioning means.

12. The image projector according to claim 7, wherein the base plate is formed in one-piece molding with the lens housing.

13. The image projector according to claim 7, further comprising a plurality of screw stems, the lens housing having a plurality of adjustment holes, and the screw stems respectively passing through the adjustment holes to press against the lens barrel.

14. The image projector according to claim 7, wherein the optical assembly comprises a color wheel, a condenser, and a fold mirror.

15. The image projector according to claim 7, wherein the imaging device is a digital micro-mirror device (DMD).

* * * * *